Oct. 24, 1961 E. A. ZUZELO 3,005,450
MASONRY SAW
Filed Sept. 4, 1959
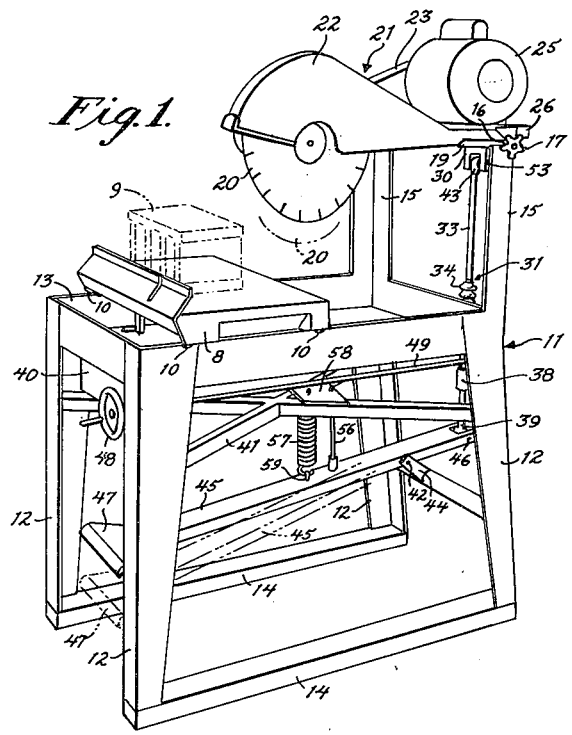
INVENTOR.
EDWARD A. ZUZELO
BY
Charles A. McClure
ATTORNEY.

United States Patent Office 3,005,450
Patented Oct. 24, 1961

3,005,450
MASONRY SAW
Edward A. Zuzelo, 652 Broad Acres Road, Narberth, Pa.
Filed Sept. 4, 1959, Ser. No. 838,251
3 Claims. (Cl. 125—14)

This invention relates to tilting saws having rotary blades for cutting masonry or like materials, concerning especially adjustment of the height of the cutting blade to accommodate different sizes of articles to be sawed.

It is customary to cut brick, concrete, tile, and like articles with a rotary blade of a cutter assembly pivotally mounted above a work surface, preferably movable, on which rests the article to be cut. The saw blade is depressed onto and into the article most conveniently by pivoting the head end of the cutter assembly downward, thereby also changing its angle of attack or tilt. The development of the saw of this invention met a need in the trade for a simple, inexpensive saw having its cutting head quickly and accurately tiltable to vary its height above the work surface without necessity for the operator to do anything but actuate an adjusting device at the front of the saw.

A primary object of the present invention is provision of such a saw having a platform for the cutting blade mounted upon, and readily tiltable about, an axis located at fixed height. An object is improved screw-adjustment of height of the blade of a masonry saw by tilting the saw platform above the work surface. A further object is simplification of the construction and operation of a tilting saw suitable for cutting masonry and like articles. Other objects of this invention, together with means and methods for attaining the various objects, will be apparent from the following description and the accompanying drawings.

FIG. 1 is a perspective view of apparatus constructed according to this invention; FIG. 2 is an elevational view of a portion of the apparatus of FIG. 1 considerably enlarged; FIG. 3 is a sectional plan view of a portion of the previous apparatus, taken at III—III of FIG. 2; and FIG. 4 is a sectional elevation of the same apparatus, taken at IV—IV of FIG. 3.

In general, the objects of the present invention are accomplished in a masonry saw comprising a frame, supporting means affixed to and extending upward from the frame, a saw platform pivotally mounted on an axis located at fixed height on the supporting means, and a tilt lever pivotally mounted on the frame, by means of linkage operatively interconnecting the lever and the saw platform and including a pair of complementarily threaded members in mating engagement with one another, one of which is adapted to be rotated by external drive means, and rotatable means external to the interconnecting linkage and operatively connected to rotate the rotatable threaded member. The invention contemplates particularly a pair of complementarily threaded cylindrical members, one externally threaded and one having an internally threaded bore therethrough, meshing with one another, the internally threaded member having also an external surface adapted to be rotated by the external drive means, whereby the position thereof is adapted to be varied longitudinally of the other threaded member, especially wherein the internally threaded member is retained at a given distance from the foot lever, the retaining means therefor being portions of the interconnecting linkage operatively connected thereto.

FIG. 1 shows, in perspective, saw frame 11 having four legs 12 with pan 13 at the top and pair of skids 14 at the bottom of the legs. Concrete block 9 (shown in phantom) rests on work cart 8, which is movably mounted on wheels 10 at the top side edges of the pan portion of the frame. Extending upward at the right is pair of standards 15, which carry pivot pin 19 in notches 16 (only one visible in this view) near the top of the standards. The pin is retained in the notches by hand wheels 17 (one visible) threaded onto its opposite ends. Pivotally mounted on this pin is cutter assembly 21.

The cutter assembly comprises principally blade guard 22 surrounding cutter blade 20 rotatively mounted on its axle carried at one end of the assembly, motor 25 carried on platform 26 at the opposite end of the assembly, and belt guard 23 enclosing the drive belt (not shown) extending from the motor to the blade. The usual electrical connections to the motor and hydraulic connections for lubricant supplied to the blade are omitted for simplicity of the showing.

Depending from near the rear edge of the saw platform is U-bracket 30, which attaches pivotally by pin 53 to coupling 43 affixed to the top of depending tilt arm 33 of tilt assembly 31. The tilt assembly, which is described in detail below, connects at its lower end to foot-operated tilt lever 45, which has plate or pedal 47 at its front end and is bifurcated at its opposite end and there pivotally attached by pin 46 to the lower end of the tilt assembly. This lever is supported by means of pivot pin 42 carried by bifurcated brace 44, whose opposite ends are attached to the rear legs of the frame. Cross brace 41 joins the front and rear legs some distance below the pan. Just to the rear of the crossover of the latter brace, crosspiece 58 is attached thereto and carries depending stop 56 and extension spring 57 ahead of pivot pin 42. The spring hooks at its lower end into eye 59 secured to the foot or tilt lever and biases the front or pedal end of the lever upward against the stop.

Also visible in FIG. 1 is adjusting hand wheel 48, which is rotatively mounted on transverse piece 40 connecting the front legs just below the pan. Shaft 49 connects the hand wheel to the tilt assembly. Shown in broken lines is a depressed or operating position of the cutting blade, as may be secured by depression of the foot lever (similarly shown) or by rotation of the hand wheel, actuation being through the tilt linkage in either case. Rotation of the adjusting hand wheel does not alter either the rest position or the degree of throw of the foot lever.

FIG. 2 shows tilt assembly 31, in elevation as viewed from the rear, considerably enlarged over the scale of FIG. 1. The tilt linkage comprises (beginning at the top) tilt arm 33, whose lower portion is threaded, as is shown by partial breaking away of surrounding protective bellows 34. The top end of the bellows is affixed by clamp 35 to an unthreaded portion of the tilt arm, and the bottom end of the bellows is affixed by clamp 36 to a housing enclosing gears described below and resembling in outline a pair of short cylinders interlinked perpendicular to one another. The housing is in two pieces (only rear piece 37 being visible in this view) held together by pair of bolts 51, with their respective nuts 52, through bosses located at the respective right and left edges thereof (located at the left and right, respectively, in this rear view). Boss 54 of the rear housing piece is visible at the left, and boss 55 at the right. Coupling 38 joins the lower end of the housing to sleeve 32, which terminates at its lower end in crosspiece 39 through which pivot pin 46 passes to secure it to the rear end of the foot lever.

FIG. 3 shows, in sectional plan, rear and front housing pieces 37 and 37', together with their associated parts, being taken midway of the bosses as indicated at III—III of FIG. 2. The two housing pieces are generally symmetrical; however, front piece 37', whose bosses are denoted as 54' and 55', has aperture 50 through the front portion thereof at the left in this view to receive shaft 49 from the front of the apparatus. Collar 60 surrounds the shaft at its entrance to the housing. The end of the shaft inside the housing has helical gear 61 located thereon and affixed thereto by key 62. Hub or shoulder 67 bearing against the inside of the housing holds gear 61 centered therein along the junction of the respective housing pieces. This gear is in mesh with helical gear 63, which has in addition an internally threaded bore. Gear 63 is threaded onto tilt arm 33, which is centered in bore 66 of the housing, at the right in this view.

FIG. 4 shows the housing and associated elements in sectional elevation taken at the junction of the front and rear housing pieces, at IV—IV of FIG. 3. Front housing piece 37' remains in this view, in which it is even more apparent that gear 61 pinned to shaft 49 engages gear 63 about and in mesh with tilt arm 33. Gear 63 is retained in place axially of the housing bore by hub or shoulder 69 bearing against the inside wall. The sides of the gear adjacent the hub bear against internal top and bottom flanges 71 and 73 of the housing so that, when rotatively driven by gear 61 in mesh therewith, gear 63 propels arm 33 upward or downward with respect to the housing itself.

Operation of this apparatus is readily understood. At any particular rest position of the tilt arm with respect to the apparatus as a whole, depression of the foot lever will lower the cutting blade at the front of the cutting assembly about the pin carried in the pair of notches on the standards above the frame proper. The article to be cut can be passed to and fro under and in contact with the blade by means of the conveyer cart reciprocating horizontally along the edges of the pan on the frame. To accommodate articles of different size or to increase the depth of cut beyond what the throw of the foot lever provides at any particular setting, the setting can be altered by simply rotating the hand wheel at the front of the apparatus.

Rotation of the adjusting hand wheel turns the helical gear on the wheel shaft and thereby drives the other helical gear located inside the housing of the tilt assembly. Rotation of the second gear, which is retained at a fixed distance from the pivotally attached rear end of the foot lever, changes the location thereof longitudinally of the tilt arm, which itself is invariable longitudinally with respect to the rear end of the saw platform to which it is pivotally attached. Thus, rotation of the hand-wheel in one direction (e.g., clockwise) shortens the separation of the rear ends of the platform and the foot lever, thereby raising the front of the saw platform, inasmuch as the foot lever is held against the stop by the biasing spring. Contrary rotation of the hand wheel lowers the cutting blade accordingly. At any setting of the wheel, depression of the foot lever lowers the blade below its corresponding rest position.

The advantage of a single, positive, foolproof adjustment of the height of the cutting blade in such a saw is obvious. The operator does not have to learn or remember how to operate additional adjusting mechanism and can remain at all time at the front of the apparatus, thereby improving operating safety and accuracy of results. The height of the cutting blade when at rest above the work surface (i.e., foot lever not depressed) is infinitely adjustable throughout the entire range of adjustment, which is especially convenient for "jam cutting" of a succession of articles to a fixed depth without use of the foot lever or any secondary adjusting means. Other benefits of the present invention will become apparent to those undertaking to practice it.

The invention is not intended to be limited to the specific construction illustrated and described above. Additional parts may be added; for example, the hand wheel shaft may be connected to the drive gear by means of a universal joint interposed therebetween to facilitate rotation and to accommodate the slight misalignment of the gears or their supporting members when the foot lever is depressed, raising the gear housing. Bevel gears or other gearing or equivalent drive means may replace the helical gears in the tilting mechanism. Many of the mentioned parts may be altered in size or shape or be subdivided or combined, and some of them may be otherwise modified, without involving a departure from the claimed inventive concept.

The claimed invention:

1. Masonry saw comprising a frame, supporting means affixed to and extending upward from the frame, a saw platform pivotally mounted on an axis located at fixed height on the supporting means, a tilt lever pivotally mounted on the frame, linkage movable as a unit substantially vertically, relatively independently of the frame, and operatively interconnecting the lever and the saw platform, the interconnecting linkage including a pair of complementarily threaded members in mating engagement with one another, one of which is adapted to be rotated by external drive means, and rotatable drive means external to the interconnecting linkage and operatively connected to rotate the rotatable threaded member, the complementarily threaded members comprising a pair of cylindrical members, one externally threaded and one having an internally threaded bore therethrough, meshing with one another, the internally threaded member having also an external surface adapted to be rotated by the external drive means, whereby the position thereof is adapted to be varied longitudinally of the other threaded member, the internally threaded member being retained at a given distance from the tilt lever, the retaining means therefor comprising part of the interconnecting linkage in the form of a sleeve interposed between the tilt lever and the internally threaded member and extending over substantially the given distance at which they are spaced from one another, the sleeve being adapted to receive therein the externally threaded member of the interconnecting linkage.

2. Masonry saw comprising a frame, a pair of standards spaced apart from one another affixed to the frame and extending upward therefrom, a pivot pin supported at fixed height by and between the standards, a saw platform pivotally mounted on the pivot pin and extending to opposite sides thereof between the standards, a depending arm-like member threaded externally and pivotally attached to the saw platform to one side of the pivot pin, a foot lever pivotally mounted on the frame, an upwardly extending sleeve-like member pivotally connected to the foot lever and adapted to receive therein the depending externally threaded member, a rotatable internally threaded member carried rotatively by the sleeve-like member at a location fixed longitudinally thereof, the external threading of the depending arm-like member being in mesh with the internal threading of the internally threaded member, the length of the arm-like member received in the upwardly extending sleeve-like member being variable upon rotation of the internally threaded member, the sleeve-like member being long enough to receive substantially all of that part of the externally threaded member threadable through the internally threaded member, the arm-like and sleeve-like members being reciprocable together, independently of rotation of the internally threaded member, upon pivoting of the foot lever, drive means engaged with the internally threaded member and adapted to rotate it with respect to both the arm-like and sleeve-like members, the drive means being reciprocable bodily, together with the engaged internally threaded member, upon reciprocation of the arm-like and sleeve-like members, a crank pivotally mounted on the frame at a location spaced from the members, and linkage operatively connecting the crank to the drive means.

3. In a masonry saw having a cutter assembly pivotally mounted and a tilt lever pivotally mounted below the cutter assembly, adjustable linkage interconnecting the tilt lever and the cutter assembly and comprising a sleeve pivotally attached to and upstanding from the tilt lever, a gearbox affixed to the upper end of the sleeve and rotatably mounting a gear threaded externally and bored and threaded internally, and a threaded arm adapted to fit within the bore of the gear and mesh therewith, the arm being connected to the cutter assembly and adapted, upon rotation of the gear in one direction, to be drawn into the sleeve and, upon rotation of the gear in the opposite direction, to be withdrawn from the sleeve, the sleeve being of length adapted to receive the maximum length of arm available, the gearbox also containing a second gear in mesh with the external threading of the first gear, the arm and sleeve, together with the gearbox and contents, being adapted to reciprocate upon pivoting of the tilt lever, thereby tilting the pivotally mounted cutter assembly, and a hand crank interconnected to the second gear and adapted to rotate it and thereby change the length of the arm received in the sleeve so as to alter the tilt of the cutter assembly at any given position of the tilt lever.

References Cited in the file of this patent

UNITED STATES PATENTS

| | | |
|---|---|---|
| 2,726,651 | Tucker | Dec. 13, 1955 |
| 2,818,058 | Zuzelo | Dec. 31, 1957 |